United States Patent [19]
Anderson et al.

[11] Patent Number: 5,395,051
[45] Date of Patent: Mar. 7, 1995

[54] TWIN TUBE LOCKING ASSEMBLY

[75] Inventors: Richard P. Anderson, Burnsville; Timothy D. Steinberg, Coon Rapids; John M. Svendsen, Corcoran, all of Minn.

[73] Assignee: Wagner Spray Tech Corporation, Minneapolis, Minn.

[21] Appl. No.: 229,240

[22] Filed: Apr. 18, 1994

[51] Int. Cl.⁶ ............................................. B05B 9/04
[52] U.S. Cl. .................................. 239/127; 239/332; 239/526; 239/600; 285/137.1
[58] Field of Search ............... 239/332, 331, 329, 375, 239/526, 127, 600, DIG. 14; 285/137.1

[56] References Cited

U.S. PATENT DOCUMENTS

| | | | |
|---|---|---|---|
| 2,704,690 | 3/1955 | Eichenauer | 239/127 |
| 2,956,822 | 10/1960 | Kates | 285/137.1 |
| 3,747,632 | 7/1973 | Kok et al. | 285/137.1 X |
| 4,693,423 | 9/1987 | Roe et al. | 239/375 X |
| 4,735,362 | 4/1988 | Trautwein et al. | 239/127 |

FOREIGN PATENT DOCUMENTS 652395 12/1964 Belgium ....................... 285/137.1
1233255 5/1971 United Kingdom ............... 239/600

Primary Examiner—Andres Kashnikow
Assistant Examiner—Lesley D. Morris
Attorney, Agent, or Firm—Faegre & Benson

[57] ABSTRACT

A twin tube locking assembly for a hand-held spray gun using an extended suction set of a hose and fitting the assembly including a ring having a body with a cylindrical skirt portion and a planar wall retaining a flange of the fitting of the suction set to a pump housing of the gun. The ring is positionable to a first position permitting engagement and disengagement of the ring to the pump housing and a second position retaining the extended suction set to the pump housing by the interaction of a margin of a fan shaped aperture in the planar wall of the ring urging a flange of a fitting of the extended suction set towards the pump housing when a plurality of lips on the housing engage and retain respective lugs on the ring. A detent member on the ring is movable past a stop member on the housing to secure the ring in the engaged position. The planar wall is deformed when the ring is engaged with the housing to secure the fitting against the housing.

14 Claims, 2 Drawing Sheets

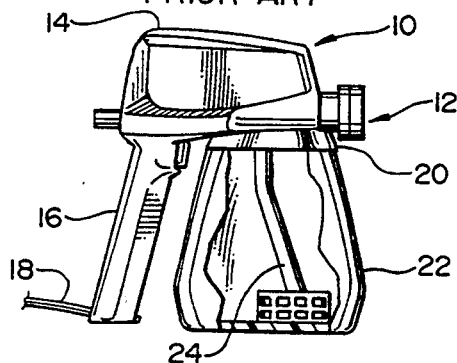
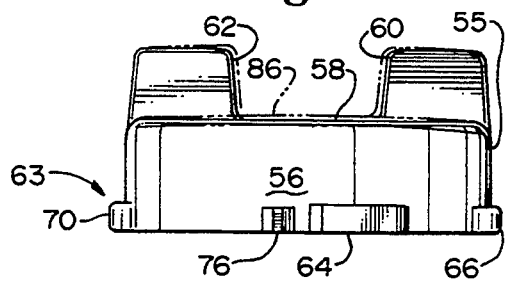
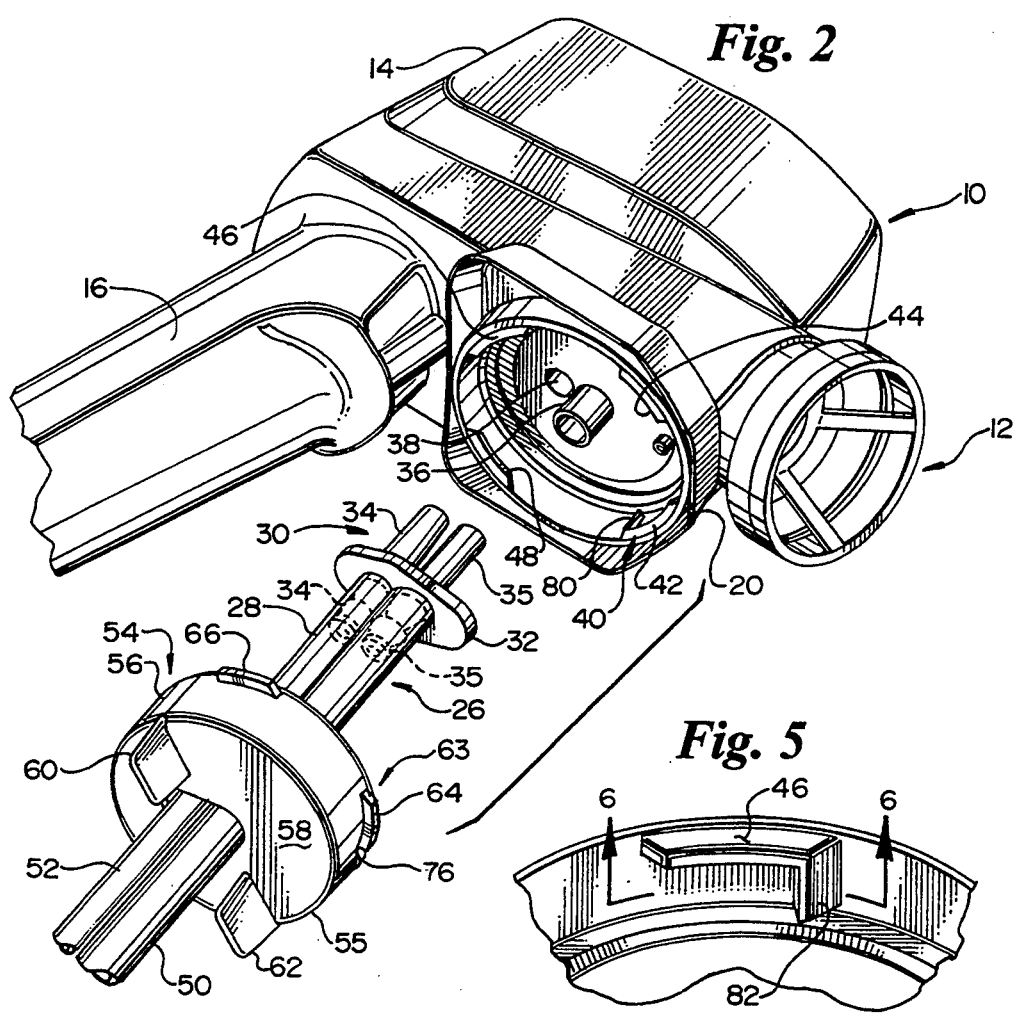
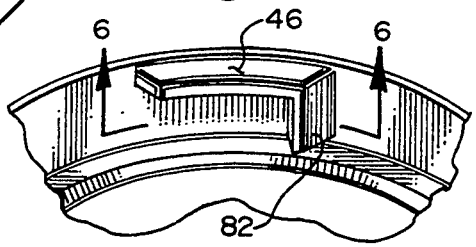

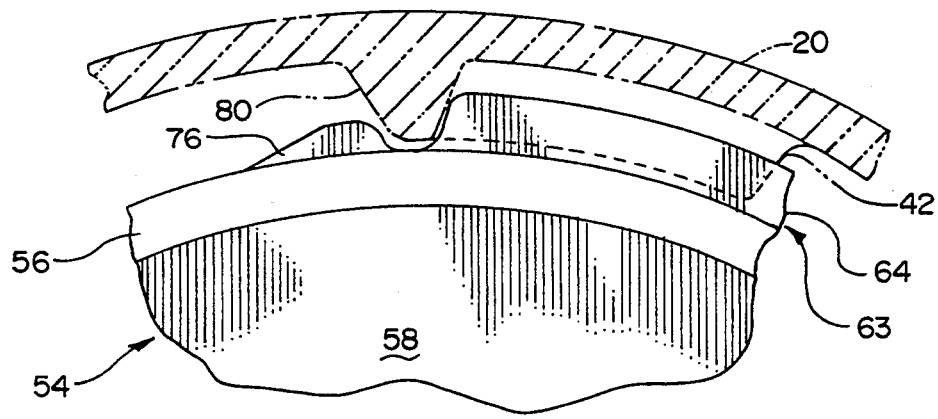
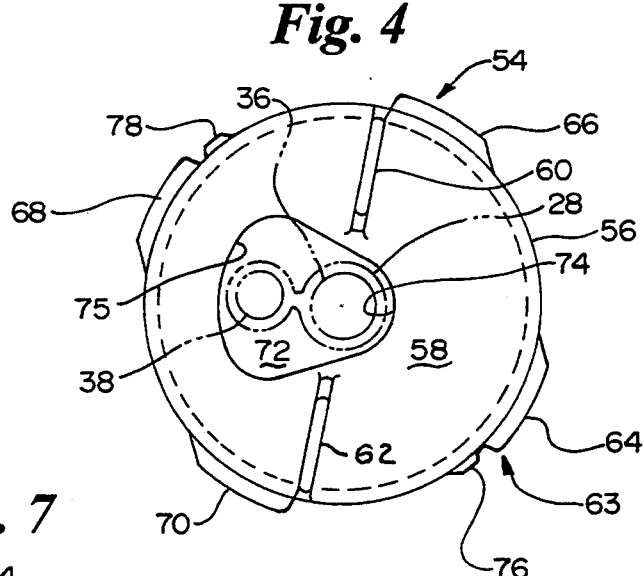
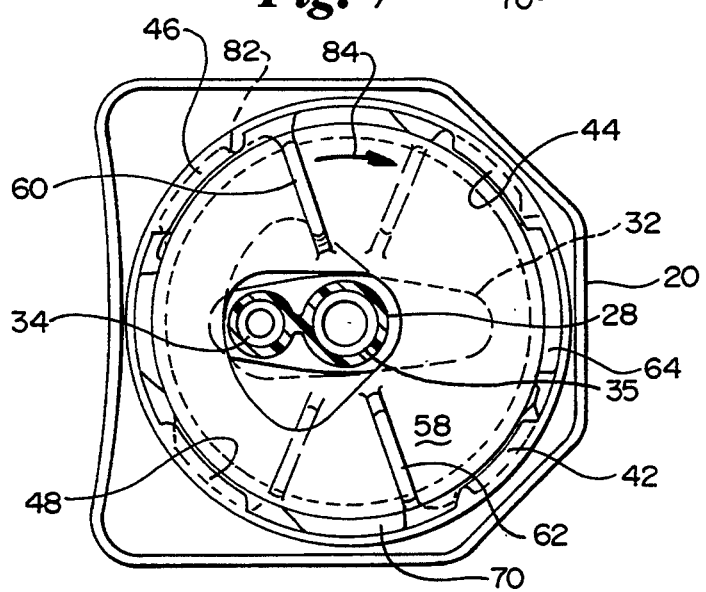

TWIN TREE LOCKING ASSEMBLY

BACKGROUND OF THE INVENTION

The present invention relates to portable spray painting equipment, particularly known as hand-held paint cup guns used for airless spraying of paint and other coating materials. A prior art cup gun 10 may be seen in FIG. 1. Gun 10 includes a spray tip 12, a gun body 14, a handle 16, a power cord 18 and a piston pump housing 20. In one embodiment, a paint cup 22 is detachably secured to the pump housing 20. In this configuration a suction tube assembly 24 is positioned to draw paint from the cup 22 and deliver it to the pump (not shown) inside housing 20 for spraying via spray tip 12.

Referring now to FIG. 2, in an alternative configuration, an extended suction set 26 may be used in place of cup 22 and suction tube assembly 24. The prior art extended suction set 26 includes only a double lumen hose 28 and a double lumen fitting 30. (Although shown in FIG. 2, it is to be understood that retaining ring 54 is not a part of the prior art extended suction set, but is intended to be used therewith.) Fitting 30 has a flange 32 extending from and formed integrally with a pair of relatively rigid nipples 34, 35. Each of nipples 34, 35 preferably has one or more conical barbs thereon to retain hose 28 to nipples 34, 35.

Pump housing 20 has a paint inlet 36 for providing a path for receiving paint to be delivered to the pump in the housing 20, and a return port 38 for providing a path for paint leaking past a piston (not shown) in the pump. Housing 20 also has a retaining means 40 in the form of a plurality of lips 42–48 adapted to engage and retain the paint cup 22 to housing 20. It is to be understood that the extended suction set 26 is for use in the absence of the paint cup 22, with the elongated double lumen hose of the suction set adapted for drawing paint from a remote container (not shown) for delivery to gun 10 via nipple 35 connected to one lumen 50, and providing a closed path via nipple 34 and the other lumen 52 for paint from the return port 38 to be carried back to the remote container when the fitting 30 has nipples 35, 34 engaged between hose 28 and the paint inlet 36 and return port 38, respectively. In the prior art when the extended suction set was held to the paint pump housing only by friction of the nipples 35, 34 received in the paint inlet 36 and return port 38, the fitting 30 was observed to sometimes unexpectedly separate from housing 20, possibly because of vibration and the separating forces between the gun 10 and the weight of the extended suction set 26 occasioned by movement of the gun as spray painting took place. Any such unexpected separation is highly undesirable since it interrupts the spray painting process and will likely require clean-up because of the unexpected release of the paint from tube 50 (and possibly tube 52 as well) after hose 28 separated from gun 10.

The present invention overcomes these shortcomings of the prior art by providing an assembly which includes a locking ring 54 preventing such unintentional separation securing the extended suction set 26 to gun 10 thus therebetween.

BRIEF DESCRIPTION OF THE DRAWINGS

FIG. 1 is a side elevation view of a prior art paint spray cup gun.

FIG. 2 is an exploded perspective view showing a cup gun, extended suction set, and twin tube locking ring useful in the practice of the present invention.

FIG. 3 is a side view of the twin tube retaining ring of the present invention.

FIG. 4 is an end view of the twin tube retaining ring.

FIG. 5 is a detail perspective view of a lug and stop member on the paint pump housing.

FIG. 6 is a fragmentary section detail view of a portion of a lip and stop member on the housing taken along line 6—6 of FIG. 5 with a mating lug and detent portion of the retaining ring added.

FIG. 7 is a bottom plan view of the piston pump housing with the extended suction set and twin tube retaining ring of the present invention showing a release position for the ring in solid lines and a locked position for the ring in phantom.

DETAILED DESCRIPTION

Referring now to the Figures, most particularly to FIGS. 2, 3, and 4, details of a locking or retaining ring 54 may be seen. Ring 54 preferably has a body 55 made up of a generally cylindrical skirt portion 56 formed integrally with a planar wall 58. A pair of ears or wings 60, 62 are also preferably formed integral with body 55 to project generally perpendicularly from planar wall 58. Ring 54 preferably also has a retaining means 63 thereon, in the form of a plurality lugs 64, 66, 68, 70 positioned on and extending from the skirt portion 56 of ring 54. Retaining means 63 is preferably formed integral with body 55. A pair of detent members 76, 78 also are preferably formed integral with body 55 and extend generally radially outward from cylindrical surface 56 adjacent lugs 64, 68, respectively. Ring 54 further has a generally fan shaped aperture 72 in the planar wall 58.

Referring now also to FIGS. 4 and 7, it may be seen that aperture 72 has an apex 74 concentric with the paint inlet 36 and an arcuate outer periphery 75 spaced apart from the apex 74 a distance equal to or greater than the distance over which the paint inlet 36 and return port 38 extend in the pump housing 20. It is to be understood that aperture 72 is sized and positioned to retain the fitting 30 and hose 28 to the housing 20 while permitting limited rotation of ring 54 with respect to housing 20 to releasably secure the ring 54 to the housing 20.

Referring now again to FIGS. 2, 5, and 6 lips 42 and 46 preferably have stop members 80, 82 associated therewith. As can be seen most clearly in FIG. 5, stop member 82 extends perpendicularly from lip 46.

Detent member 76 is spaced apart from lug 64 a distance equal to the width of stop member 80. When ring 54 is secured to housing 20, stop member 80 is received between detent 76 and lug 64, positively retaining ring 54 to housing 20 when the lugs 64–70 are moved adjacent the respective lips 42–48 and the detent member 76 is moved past stop member 80 to the position shown in FIG. 6. The same arrangement exists for detent member 78.

Referring now to FIGS. 2 and 7, to assemble the various parts together, hose 28 is inserted through aperture 72 of ring 54. Fitting 30 is then attached to hose 28 and retained thereon via the frictional interengagement of nipples 35, 34 (and more particularly the conical barbs thereon) with the lumens or openings in tubes 50, 52. The remaining free ends of nipples 35, 34 are then inserted into the paint inlet 36 and return port 38.

Ring 54 is then moved along hose 28 to the position shown in FIG. 7 in solid lines. Once the lugs 64–70 are moved axially past lips 42–48, ring 54 is rotated in the direction of arrow 84 to the position shown in phantom lines in FIG. 7. The extended section set 26 is thereby secured to housing 20 by ring 54 since the frictional interengagement of hose 28 to fitting 30 is relatively high, preventing accidental disengagement at that point. Flange 32 of fitting 30 is restrained from axial movement away from housing 20 by the margin of planar surface 58 around aperture 72. It is to be understood that the distance between apex 74 and outer periphery is preferably larger than the largest width of hose 28 and smaller than the largest end-to-end dimension of flange 32 of fitting 30 to prevent passage of flange 32 through aperture 72 while permitting limited rotation of ring 54 around the extended suction set 26 when it is connected to gun 10. In a preferred embodiment, the axial length of the skirt 56 of the ring 54 is dimensioned to provide an interference fit when the ring 54 is assembled against the fitting 30 installed in the housing 20. This results in a slight deformation indicated by chain line 86 in FIG. 3, such that the wall 58 urges the flange 32 towards the housing 20, thus ensuring a good seal between the fitting 30 and the paint inlet 36 and the return port 38.

The invention is not to be taken as limited to all of the details thereof as modifications and variations thereof may be made without departing from the spirit or scope of the invention.

We claim:

1. Apparatus for retaining an extended suction set to portable paint spray equipment comprising:
   a) hand-held paint spray gun carrying a piston pump housing having
      i) a paint inlet for providing a path for paint to be delivered to a piston pump in the housing,
      ii) a return port for providing a path for paint leaking past a piston in the gun, and
      iii) first retaining means adapted to engage a paint cup to the pump housing;
   b) an extended suction set for use in the absence of the paint cup, the suction set having
      i) an elongated double lumen hose for drawing paint from a remote container for delivery to the gun in one lumen and providing a closed path for paint from the return port to be carried back to the remote container, and
      ii) a double lumen fitting having a flange extending from a pair of relatively rigid nipples adapted to mate the hose to the paint inlet and return port; and
   c) a twin tube retaining ring for securing the double lumen fitting to the paint spraying gun, the ring having
      i) a body,
      ii) an aperture in the body smaller than the flange and shaped to permit limited rotation of the retaining ring with respect to the gun and fitting when the fitting is connected to the inlet and return port of the gun, and
      iii) second retaining means on the ring adapted to engage the first retaining means on the pump housing such that the fitting is releasably secured to the inlet and return port when the first and second retaining means are engaged and the fitting is free to be released from the inlet and return port when the first and second retaining means are disengaged.

2. The apparatus of claim 1 wherein the first retaining means comprises a plurality of lips on the pump housing.

3. The apparatus of claim 2 wherein the second retaining means comprises a plurality of lugs extending from and positioned on the body of the ring for engaging the plurality of retaining lips on the pump housing.

4. The apparatus of claim 3 wherein the plurality of lips are located on a circle enclosing the inlet and return port and the first retaining means further comprises at least one stop member extending generally perpendicularly from one of the lips and positioned to abut at least one lug when the first and second retaining means are engaged.

5. The apparatus of claim 4 wherein the paint inlet is centered in the circle and the aperture in the body of the ring is generally fan-shaped and has an apex concentric with the paint inlet, and an arcuate outer periphery spaced apart from the apex a distance greater than the distance over which the paint inlet and return port extend in the pump housing such that the aperture permits limited rotation of the ring with respect to the housing to engage and disengage the ring from the housing when the fitting is located between the ring and the housing.

6. The apparatus of claim 5 wherein the arcuate outer periphery of the fan-shaped aperture is spaced apart from the apex a distance less than end-to-end distance of the flange such that the ring retains the flange to the housing when the first and second retaining means are engaged and the fitting is located between the ring and the housing.

7. The apparatus of claim 4 wherein the plurality of lugs are located on a circle circumscribing the body of the ring and the second retaining means further comprises at least one detent member on the same circle as the lugs and circumferentially spaced apart from one of the lugs by a distance equal to a width of the stop member to positively retain the ring to the pump housing when the lugs are moved adjacent the lips and the detent member is moved past the stop member.

8. The apparatus of claim 7 wherein the lips are circumferentially spaced apart from each other along the circle enclosing the inlet and return port.

9. The apparatus of claim 1 wherein the ring further comprises
   iv) a pair of ears located on a diameter of the body of the ring and projecting generally perpendicularly away from the body of the ring.

10. The apparatus of claim 1 wherein the flange has a generally planar surface and the aperture in the body of the ring is located in a wall portion generally parallel to the planar surface of the flange when the fitting and ring are assembled to the pump housing.

11. The apparatus of claim 10 wherein the wall portion contacts the planar surface of the flange and urges the fitting towards the pump housing when the fitting is received between the ring and the pump housing.

12. The apparatus of claim 11 wherein the wall portion contacting the flange is deformed as it contacts the flange to urge the fitting towards the housing.

13. A method of securing an extended suction set to a portable spray painting gun comprising the steps of:
   a) inserting a double lumen hose through a fan-shaped aperture in a retaining ring;

b) attaching a fitting to the end of the hose to form an extended suction set made up of the hose and fitting wherein the fitting has a flange larger than the aperture in the ring;
c) inserting the fitting into the gun; and
d) moving the ring along the hose towards the gun and engaging interfitting surfaces on the ring and the gun such that the extended suction set is releasably secured to the gun.

14. The method of claim 13 wherein step d) further comprises deforming the ring against the fitting as the interfitting surfaces on the ring and gun are engaged such that the fitting is urged toward the gun to secure the suction set to the gun.

* * * * *